United States Patent [19]

Regueiro et al.

[11] 4,333,147
[45] Jun. 1, 1982

[54] MULTIPLEXED INDUCTIVE AUTOMATED GUIDANCE FOR MOVING VEHICLES

[75] Inventors: William R. Regueiro, Troy; Robert W. Cowan, Sterling Heights; Richard W. Dick, Redford Township, Wayne County, all of Mich.

[73] Assignee: General Motors Corporation, Detroit, Mich.

[21] Appl. No.: 149,437

[22] Filed: May 13, 1980

[51] Int. Cl.³ .......................... G06F 15/50; B62D 1/24
[52] U.S. Cl. .................................... 364/436; 180/168; 364/424
[58] Field of Search ......................... 364/424, 426, 436; 180/167, 168; 104/88; 370/92

[56] References Cited

U.S. PATENT DOCUMENTS

| | | | |
|---|---|---|---|
| 3,027,544 | 1/1958 | Atkinson et al. | 340/150 X |
| 3,498,403 | 3/1970 | Kohls | 180/168 |
| 3,518,628 | 6/1970 | Giel et al. | 340/150 X |
| 3,610,363 | 10/1971 | Hartley | 180/168 |
| 3,694,757 | 9/1972 | Hanna, Jr. | 370/92 X |
| 3,710,027 | 1/1973 | Herter et al. | 370/92 |
| 3,768,586 | 10/1973 | Thompson et al. | 180/168 |
| 3,933,099 | 1/1976 | Sieb | 180/167 X |
| 4,097,695 | 6/1978 | Grace et al. | 370/92 |
| 4,215,759 | 8/1980 | Diaz | 180/168 |

*Primary Examiner*—Felix D. Gruber
*Attorney, Agent, or Firm*—Mark A. Navarre

[57] ABSTRACT

An automated guidance control system for controlling the lateral and longitudinal position of one or more vehicles along a plurality of partially coincident travel paths defined by an equal number of guideway conductors. A wayside installation uses time-division-multiplexing techniques to communicate vehicle longitudinal control information over each guideway conductor in sequence and each vehicle develops timing information from the received control information to enable lateral guidance sampling in timed relationship with the transmission of the control information.

3 Claims, 5 Drawing Figures

MULTIPLEXED INDUCTIVE AUTOMATED GUIDANCE FOR MOVING VEHICLES

This invention relates to automated guidance control systems for vehicles and more particularly to a guidance system wherein a wayside installation controls the operation of a plurality of vehicles traveling over two or more fixed partially coincident guideways.

The prior art discloses numerous automated guidance control systems, some of which communicate lateral guidance data from a wayside installation to one or more vehicles via a conductor or conductor pair buried in a guideway defining the vehicle travel path. The wayside installation applies an alternating current signal to the guideway conductor generating an electromagnetic near field in the guideway about the conductor. An antenna fixed to the underbody of the vehicle is used to sense the field strength and a vehicle-mounted control system generates a lateral error signal as a function of the sensed field strength relative to an electromagnetic field null existing directly over the conductor. Conventional vehicle servo systems respond to the error signal by making steering adjustments to maintain the vehicle in a predetermined lateral position with respect to the guideway conductor.

It is also known in prior automated guidance art to develop vehicle control data at a wayside installation in response to position or status data communicated from each of the vehicles to the wayside installation and to communicate the vehicle control data to each of the vehicles in order to safely control their operation along a travel path. Communications between the wayside installation and the vehicles are often performed in a non-radiative manner over a suitable communication link such as a conductor disposed in the guideway. For example, the data may be inductively communicated across an air gap between the conductor and a vehicle-mounted antenna.

Attempts have been made to consolidate lateral and longitudinal communications by modulating the alternating lateral guidance signal in accordance with vehicle control data developed at the wayside installation. In this way, the modulated guidance signal impressed upon the guideway conductor can communicate both a lateral guidance reference and longitudinal control data from the wayside installation to the vehicles.

Generally, an automated guideway system must employ multiple vehicle travel paths in order to satisfy transportation needs. Accordingly, each vehicle must be capable of performing travel path selection at each junction of two or more travel paths. Most prior art automated guideway systems achieve travel path selection by assigning different communication frequencies to each of the travel paths, the separation in the various frequencies being sufficiently large to minimize mutual interference. However, this approach results in considerable hardware complexity at both the wayside installation and aboard each vehicle. For a guideway system having three partially coincident travel paths, for example, the wayside installation would necessarily include three transmitters and power amplifiers, and each vehicle would require filters to discriminate against the other two adjacent guideway frequencies.

Accordingly, it is an object of this invention to provide an improved automated guideway control system having multiple vehicle travel paths wherein travel path selection is reliably achieved while minimizing hardware complexity and mutual interference among the travel paths.

It is a further object of this invention to provide an improved automated guidance sytem having two or more partially coincident vehicle travel paths defined by an equal number of guideway conductors and one or more vehicles dedicated to each travel path, wherein a wayside installation communicates longitudinal control information to each of the vehicles in sequence, and wherein lateral guidance equipment aboard each of the vehicles is synchronously enabled to sense the lateral position error of the vehicle relative to the location of the guideway conductor associated with the travel path to which the vehicle is dedicated.

These objects are carried forward by using time division multiplexing techniques at a wayside installaton to communicate with the various vehicles traversing the partially coincident travel paths. The wayside installation energizes each guideway conductor in sequence with a very low frequency (VLF) carrier modulated in accordance with vehicular longitudinal control information developed by a wayside computer. Although the data used to modulate the VLF carrier is intended for a selected vehicle, all vehicles dedicated to the travel path associated with the energized conductor use the signal to develop lateral guidance control information. Each communication from the wayside installation also includes vehicle identification information corresponding to the selected vehicle to ensure proper reception of the longitudinal control information and proper sampling of the lateral position error of the vehicle. Following the reception of wayside-to-vehicle longitudinal control information, the selected vehicle modulates a low frequency (LF) carrier with status information for transmission to the wayside installation over the same guideway conductor.

In the Drawings

Figure 1:
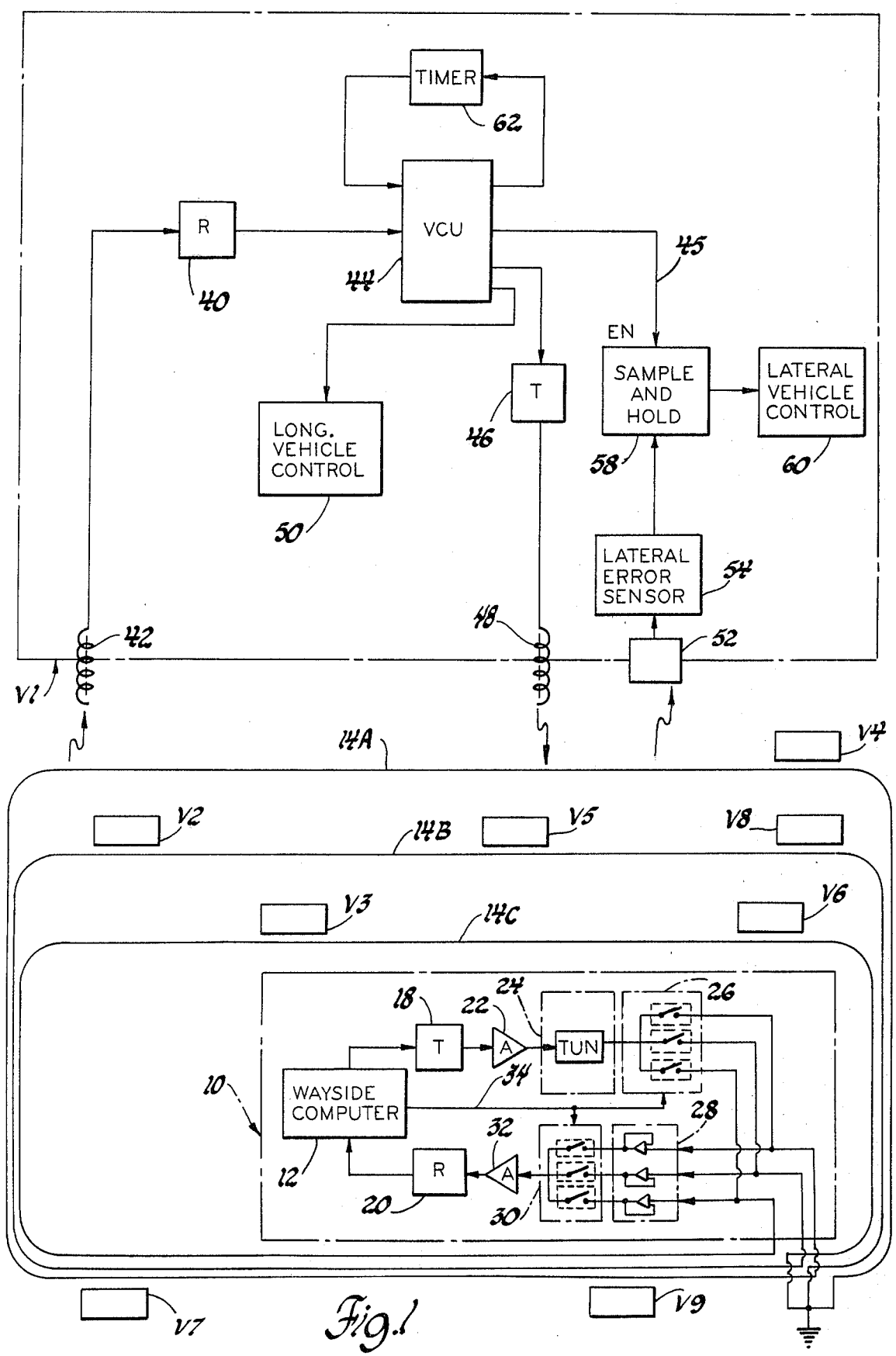
FIG. 1 is a block diagram illustrating the wayside and vehicle guidance equipment.

Referring now to FIG. 1, reference numeral 10 generally designates a wayside installation for controlling the operation of a plurality of vehicles V1–V9 traveling over guideway conductors 14A–14C which define three partially coincident travel paths. It will be seen that the coincident travel path portion is shown at the sides and bottom of FIG. 1 and the non-coincident or divergent travel path portion is shown near the middle of FIG. 1. While traversing the divergent travel path portion, the vehicles are positioned over a single guideway conductor; while traversing the coincident travel path portion, the vehicles are positioned over a plurality of guideway conductors. Vehicles V1–V9 are preferably propelled in a conventional manner by an electric motor or an internal combustion engine although the vehicle type and the specific manner of propulsion does not effect the scope of this invention. Based on the guideway geometry and previously received vehicle status information, wayside installation computer 12 develops longitudinal control messages for the vehicles to ensure safe and efficient guideway operation. Each control message is arranged in a standard format and applied to wayside transmitter (T) 18 which modulates the message on a very low frequency (VLF) carrier for communication to a selected vehicle over the guideway conductor defining the travel path to which the selected vehicle is dedicated. After the selected vehicle receives and demodulates the control message, it develops a vehicle-to-wayside message containing vehicle status information, such as the longitudinal position and speed of the vehicle. A vehicle transmitter modulates the information on a low frequency (LF) carrier for transmission to wayside receiver (R) 20 via the guideway conductor. Vehicle status communications demodulated by wayside receiver 20 are then applied to wayside computer 12, which evaluates the status information in order to develop subsequent control messages.

Power amplifier (A) 22 and tuning network (TUN) 24 connect wayside transmitter 18 to demultiplexer 26. Tuning network 24 comprises various lumped impedance elements (capacitors and resistors) chosen to match the approximate impedance of the guideway conductors in order to minimize transmission power losses and optimize signal-to-noise ratio and system bandwidth. It will be appreciated that separate tuning networks may be required for each guideway conductor if their lengths vary appreciably. Pre-amplifier 32 connects multiplexer 30 to wayside receiver 20, and buffers 28 connect one terminal of each guideway conductor 14A–14C to multiplexer 30. The other terminal of each guideway conductor is connected to ground potential as shown. Buffer 28 provides a high input impedance for vehicle-to-wayside communications to minimize cross-talk or coupling of appreciable current between the energized conductor and the deenergized conductors.

Wayside multiplexer 20 and demultiplexer 26 control the flow of status and control communications over guideway conductors 14A–14C in response to timing information supplied by wayside computer 12 over line 34. Both multiplexer 30 and demultiplexer 26 are shown as an array of switches, selectively actuated to connect a specific guideway conductor 14A–14C to the wayside installation circuitry. Preferably, multiplexer 30 and demultiplexer 26 are made with integrated-circuit analog multiplexers and low "on" resistance FETs, respectively, controlled in accordance with discrete binary signaling provided on line 34 by wayside computer 12. It will be appreciated that the timing information provided over line 34 may be developed external to wayside computer 12 with a ring counter or its equivalent, if the timing information is also applied as an input to wayside computer 12.

In operation, the timing signal provided on line 34 controls demultiplexer 26 so that each guideway conductor 14A–14C is energized in sequence with longitudinal control communications. At the same time, the timing signal controls multiplexer 30 to apply to preamplifier 32 vehicle status communications from the guideway conductor last energized by wayside transmitter 18. FIGS. 2–5 illustrate timing information that more clearly describes the communication sequence.

Referring to the upper portion of FIG. 1, vehicle V1 is shown in detail in order to aid in the description of the vehicle guidance equipment, each vehicle being equipped essentially the same. Accordingly, the nature and operation of the other vehicles V2–V9 will be understood by analogy to the description of vehicle V1. Each vehicle includes a receiver (R) 40 for receiving longitudinal control information from wayside transmitter 18 via antenna 42, a vehicle control unit (VCU) 44 for evaluating the control information, and a transmitter (T) 46 for transmitting status information via antenna 48 to wayside receiver 20 following the reception of a longitudinal vehicle control message. Receiver 40 includes filter circuits (not shown) for discrimminating between LF vehicle-to-wayside communications and VLF wayside-to-vehicle communications. After each vehicle control message is received and evaluated, vehicle control unit 44 actuates longitudinal vehicle control unit 50 in accordance with the control message. It will be appreciated that control unit 50 wll include conventional vehicle control devices such as a throttle and a brake, and servo sytems for operating the same. Antennas 42 and 48 are shown vertically oriented for the sake of convenience and clarity; preferably, however, they are oriented horizontally and perpendicular to the guideway conductors 14A–14C. Antenna array 52 senses the electromagnetic field generated by the modulated wayside-to-vehicle communication signal applied to guideway conductor 14A. Antenna array 52 applies the signal to lateral error sensor 54, which develops an electrical signal indicative of the lateral deviation of antenna 52 from guideway conductor 14A. The lateral error signal from lateral error unit 54 is applied to the data input of sample-and-hold circuit 58 for selective application to lateral vehicle control unit 60, as will be described. Lateral control unit 60 responds to a lateral error signal applied thereto to make vehicle steering adjustments for reducing the lateral error signal to zero, aligning antenna array 52 over guideway conductor 14A. Antenna array 52, lateral error sensor 54, and lateral vehicle control unit 60 may be any of a number of known control systems that sense an electromagnetic field generated by an alternating current signal in a guideway conductor as a means of determining the lateral position error of a vehicle with respect to the location of the guideway conductor, and effect steering adjustments to reduce the lateral position error to zero. A control system that meets the above specifications is described in detail in the Cataldo U.S. Pat. No. 2,990,902; preferably, however, the lateral guidance system is like the one described in the publication, "Automated Control of Guideway Transit Vehicles," presented at the 29th IEEE Conference on Vehicular Technology by G. Harder and R. Smisek; March 1979. Sample-and-hold circuit 58 is a conventional device and is selectively enabled by vehicle control unit 44 via line 45 to latch a lateral error signal from lateral error sensor 54 for application to lateral vehicle control unit 60. As will belater described, timing information extracted from the wayside-to-vehicle communications synchronize timer 62 with subsequent wayside-to-vehicle communications over the same guideway conductor so that vehicle control unit 44 can momentarily enable sample-and-hold circuit 58 via line 45 in timed relationship with the transmission of a way-side-to-vehicle communication over guideway conductor 14A. This relationship is essential to reliable travel path selection at the junction of two or more guideway conductors, and will be more fully described in reference to FIGS. 2–5.

Figure 2:
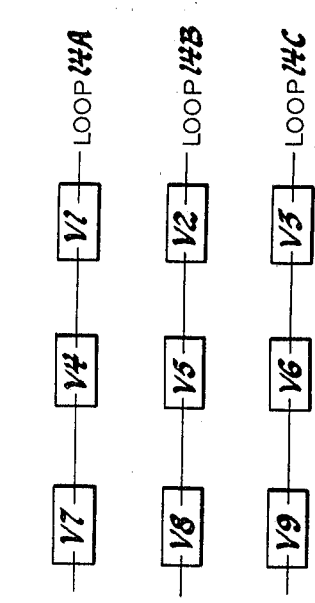
FIG. 2 illustrates vehicle and travel path designations according to the preferred embodiment of this invention.

FIG. 2 defines the guideway designations and indicates which vehicles V1–V9 are dedicated to each guideway conductor 14A–14C. Accordingly, it will be seen that vehicles V1, V4, and V7 are dedicated to the travel path defined by guideway conductor loop 14A; vehicles V2, V5 and V8 are dedicated to the travel path defined by conductor loop 14B; and vehicles V3, V6, and V9 are dedicated to the travel path defined by conductor loop 14C.

Figure 3:
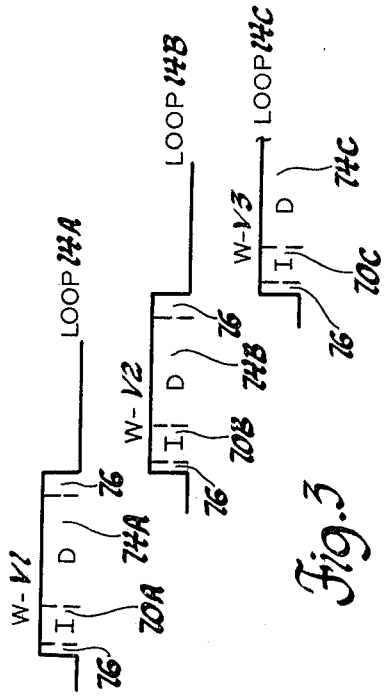
FIG. 3 illustrates representative wayside-to-vehicle communications.

FIG. 3 is an abbreviated timing diagram, illustrating the content and sequence of the wayside-to-vehicle communications. The duration of each communication (wayside-to-vehicle or vehicle-to-wayside) is a function of the amount of data to be exchanged, the selected data rate, and various time allowances for signal switching and data acquisition.

Referring more specifically to FIG. 3, sequenced wayside-to-vehicle communications are shown for vehicles V1 (W-V1), V2 (W-V2), and V3 (W-V3) via guideway conductor loops 14A–14C respectively. Each wayside-to-vehicle communication includes an identification portion (I) 70A–70C and a data portion 74A–74C.

The identification portions 70A–70C comprise several bits arranged in a coded format that corresponds to the identity of the vehicle for which the communication is intended. For example, identification portion 70A contains a multi-bit code corresponding to the identification code for vehicle V1. The vehicle control unit 44 aboard each vehicle is capable of comparing the identification bits 70A–70C with similar bits corresponding to its own identity to determine if it is the intended receiver of the information.

The data portions 74A–74C contain longitudinal position commands which are obeyed by the vehicle if the identification portion 70A–70C matches the identification bits of the vehicle and message error checks are satisfied. If the identification bits 70A–70C do not match, the data portion of the message is ignored.

Vehicle-to-wayside communications are formulated and transmitted over the guideway conductor following receipt of a wayside-to-vehicle communication only if the identification bits of the wayside-to-vehicle communication match the vehicle identity. Since only the selected vehicle traveling over the energized guideway conductors transmits vehicle status information, vehicle-to-wayside communications need not include identication bits. Of course, such bits may be included if desired for verification purposes. It will also be appreciated that a short duration carrier settling time 76 may be allocated at the beginning and end of both wayside-to-vehicle and vehicle-to-wayside communications in order to ensure accurate reception of data at the vehicle and wayside receivers.

Figure 4:
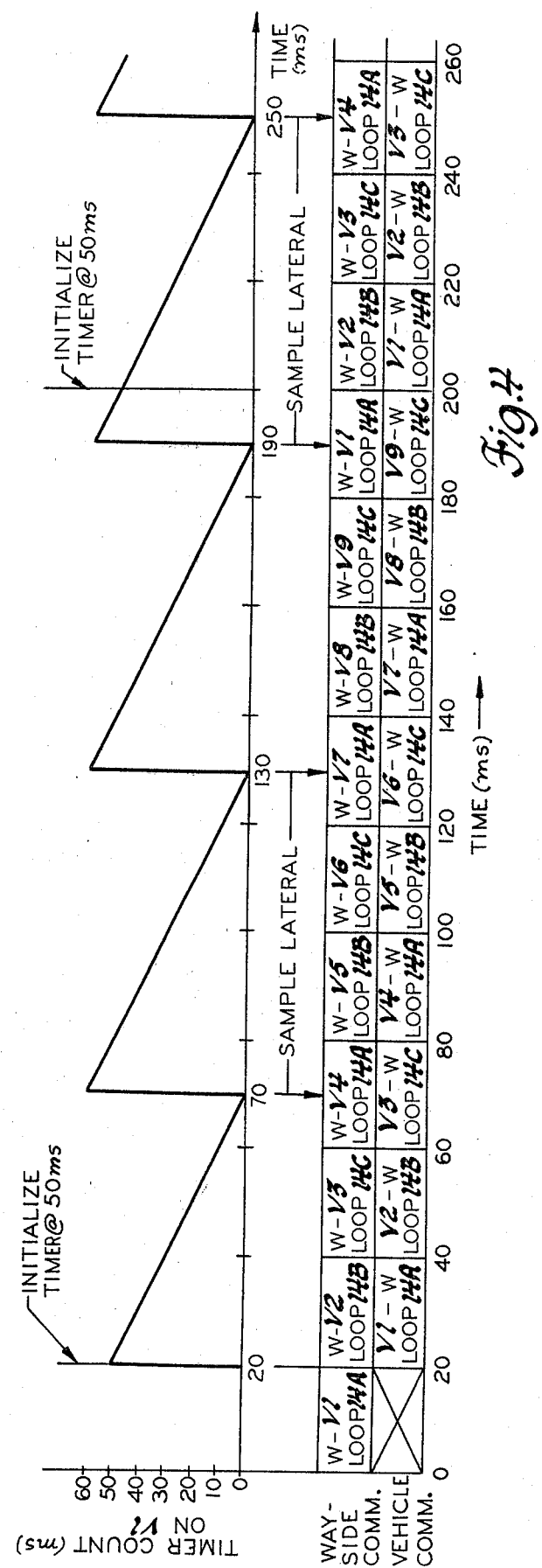
FIG. 4 is a timing diagram for wayside-to-vehicle control communications, vehicle-to-wayside status communications, and vehicle lateral guidance sampling.

FIG. 4 is a timing diagram illustrating the count in timer 62 aboard vehicle V1. Also shown is the sequence of wayside-to-vehicle (W-V) and vehicle-to-wayside (V-W) communications. Note that for this figure each communication (W-V or V-W) has a duration of 20 milliseconds. Accordingly, each guideway conductor 14A–14C is excited with a wayside-to-vehicle communication every 60 milliseconds. As will be explained, the timer aboard each vehicle is synchronized to enable a sample-and-hold circuit to sample lateral guidance information every 60 milliseconds in timed relationship with the transmission of a wayside-to-vehicle communication over the guideway conductor to which the vehicle is dedicated. At the termination of the wayside-to-vehicle communication for vehicle V1 over guideway loop 14A (20 ms on the time scale) timer 62 is initialized to 50 milliseconds, VCU 44 having determined that the message was intended for vehicle V1. That is, vehicle control unit 44 loads a digital number into timer 62 such that timer 62 requires 50 milliseconds to decrement its count to zero. As timer 62 decrements to zero, wayside installation 10 simultaneously transmits control information to vehicle V2 (W-V2) over guideway loop 14B, and receives status information from vehicle V1 (V1-W) over guideway loop 14A. That is, multiplexer 30 and demultiplexer 26 are controlled by the timing signal on line 34 to simultaneously connect wayside transmitter 18 to guideway conductor 14B and wayside receiver 20 to guideway conductor 14A. Twenty milliseconds later (40 mS on the time scale) wayside installation 10 simultaneously transmits control information to vehicle V3 over guideway loop 14C and receives status information from vehicle V2 over guideway loop 14B. Twenty milliseconds later (60 mS on the time scale), wayside installation 10 again transmits control information over guideway loop 14A, only this time to vehicle V4. At the midpoint of the W-V4 communcation (70 mS on the time scale), timer 62 will have decremented its count to zero. In response to the zero count in timer 62, vehicle control unit 44 momentarily enables sample-and-hold circuit 58 via line 45 to sample the lateral error signal as indicated in FIG. 4. Timer 40 is then reset to 60 milliseconds instead of 50 milliseconds. It will be appreciated that in this way, the count in timer 62 reaches zero (to enable lateral error sampling) at the midpoint of the following wayside-to-vehicle communication over guideway conductor 14A (W-V7). It will also be appreciated in reference to FIG. 4 that the timer aboard each vehicle is synchronized with the wayside timing information on line 34 every 180 milliseconds. In the interim, the vehicle control unit aboard each vehicle resets its timer twice to enable lateral error sampling every 60 milliseconds; at 70 mS, 130 mS, 190 mS, and so on as indicated in FIG.4.

Figure 5:
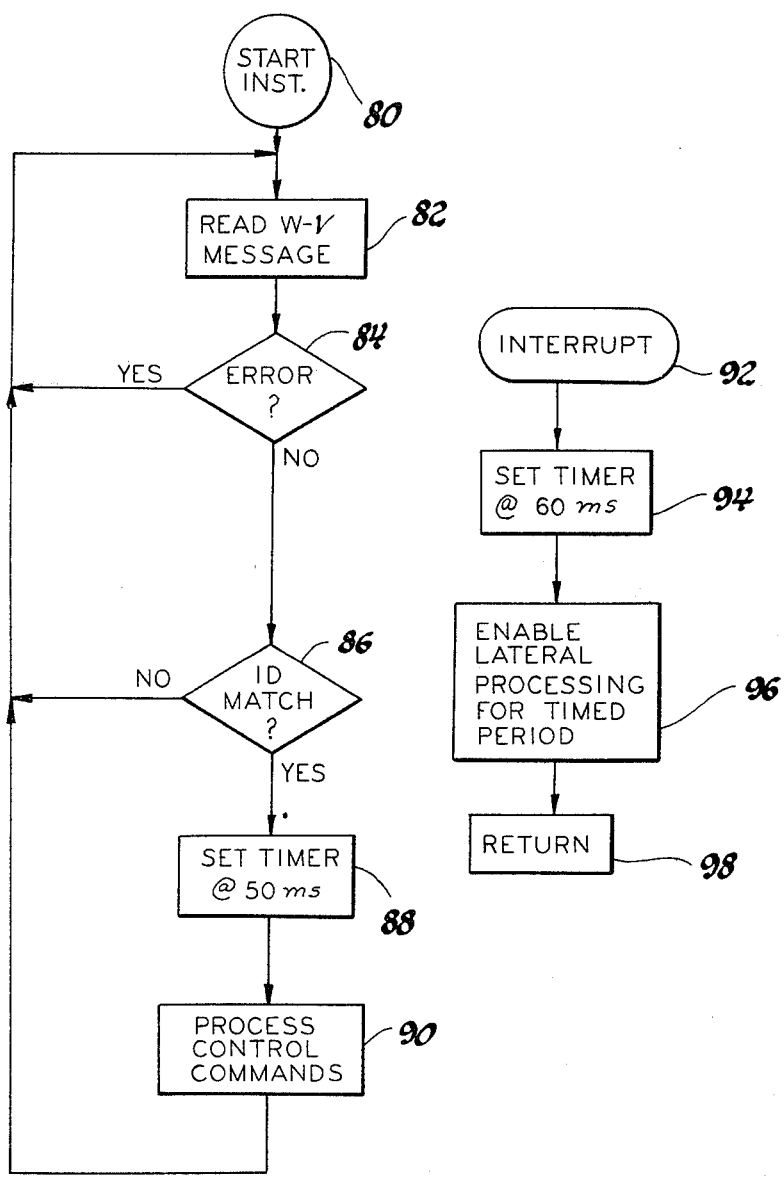
FIG. 5 is a flow chart illustrating the lateral guidance sampling technique performed by each vehicle computer.

FIG. 5 is a flow diagram of a computer program executed by each vehicle control unit as a means for implementing the lateral error sampling routine discussed above. Reference numeral 80 designates a series of start-up instructions to be executed by each VCU when the vehicle is initially started. When wayside installation 10 transmits a vehicle control message over a guideway conductor in the vicinity of the vehicle, the VCU reads the message (designated at block 82) and checks the message for communicational errors (designated at block 84). If the message as read contains an error, the VCU waits for the transmission of the next message. If the control message contains no detectable errors, the VCU compares the identification portion of the message with bits corresponding to the identity of the vehicle (designated at block 86). If the identification data matches, the VCU sets its timer at 50 milliseconds to synchronize its count with the wayside timing information (designated at block 88) and proceeds to process the control message (designated at block 90) as described in reference to FIG.1. If the identification data does not match, the VCU ignores the contents of the control message and waits to receive the following wayside-to-vehicle communication.

Reference 92 designates an interrupt signal which is applied to the VCU whenever the timer output is equal to zero. At the instant the interrupt is generated, the execution of the program instructions represented by the above-described flow diagram is temporarily suspended and the VCU executes the interrupt instructions instead. It will be appreciated that interrupt 92 may be masked (ignored) until the timer is initially set at 50 milliseconds as designated at block 88. When interrupt 92 is generated, the VCU sets the timer at 60 milliseconds (designated at block 94) and momentarily enables the vehicle sample-and-hold circuit to sample the lateral error signal developed by the vehicle's lateral error sensor (designated at block 96). When the interrupt routine is completed, the return instruction (designated at block 98) returns the VCU to the point in the main flow diagram at which interrupt 92 was generated.

Broadly speaking, if N represents the number of guideway conductors and D represents the duration of each guideway communication, timer 62 is set to ND seconds each time interrupt 92 is serviced. Additionally, timer 62 is set to ND-(D/2) seconds ecah time VCU 44 determines that its respective vehicle is the intended receiver of a wayside communication (as indicated at block 88 of FIG. 5).

From the foregoing it will be appreciatedthat wayside computer 12 and each VCU must comprise a computer of sorts to implement the described instructions. Preferably each VCU comprises a digital microprocessor and ancillary support circuitry. Since devices of this sort are well known by persons skilled in the art, it is felt that the information disclosed herein is sufficient to enable such person to practice this invention.

As described, this invention broadly relates to an automated guidance system for controlling the operation of a plurality of vehicles over a plurality of partially coincident travel paths, and enabling reliable travel path selection at junctions of two or more of the travel paths. Accordingly, some applications for this invention include mass transportation, warehouse vehicle control, vehicle testing, and assembly line operations. It should be apparent that the guideway geometry illustrated in FIG. 1 may be modified to suit a particular application or need without departing from the scope of this invention. For example, guideway loops 14A–14C may be arranged in a concatenated manner wherein each loop would be partially coincident with only one other loop. It is not considered to be necessary, however, to illustrate other guideway arrangements since to do so would not further ones understanding of this invention.

The embodiments of the invention in which an exclusive property or privilege is claimed are defined as follows:

1. An automated guidance control system comprising:
   a plurality of guideway conductors arranged to define an equal number of partially coincident vehicle travel paths;
   one or more vehicles associated with each of said guideway conductors;
   wayside control means for transmitting wayside communications over each of said guideway conductors in timed sequence, each communication comprising an identification portion uniquely representing the identity of a selected vehicle and a control portion for controlling the longitudinal position of said selected vehicle;
   lateral guidance means aboard each vehicle including first means for developing a lateral error signal in response to the detection of an electromagnetic field surrounding a current carrying guideway conductor in the vicinity of the vehicle and second means for controlling the lateral position of the vehicle in response to a lateral error value applied thereto;
   sampling means for applying a lateral error value to said second means, said sampling means being effective when enabled to update said applied value in accordance with the instantaneous value of said lateral error signal;
   control means aboard each vehicle for receiving wayside communications from a guideway conductor, said control means including identity recognition means effective to compare the identification portion of a received wayside communication with a compatible representation of the identity of its respective vehicle and to detect correspondence therebetween; and
   means responsive to said identity recognition means for momentarily enabling said sampling means in timed relationship with said correspondence, said timed relationship corresponding to the transmission of subsequent waysidecommunications over the same guideway conductor, whereby each vehicle is controlled to follow the travel path defined by the conductor with which it is associated.

2. An automated guidance control system comprising:
   a plurality of guideway conductors arranged to define an equal number of partially coincident vehicle travel paths;
   one or more vehicles associated with each of said guideway conductors;
   wayside control means for transmitting uniform duration wayside-to-vehicle communications over each of said guideway conductors in sequence, each communication comprising an identification portion uniquely corresponding to the identity of a selected vehicle, and a control portion containing control information for said selected vehicle;
   lateral guidance means aboard each vehicle including first means for developing a lateral error signal in response to the detection of an electromagnetic field surrounding a current carrying guideway conductor in the vicinity of the vehicle and second means for controlling the lateral position of the vehicle in response to a lateral error value applied thereto;
   sample-and-hold means for applying a lateral error value to said second means, said sample-and-hold means being effective when enabled to update said applied value in accordance with the instantaneous value of said lateral error signal;
   control means aboard each vehicle for receiving and processing wayside-to-vehicle communications from said guideway conductor, said control means including timing means for developing control pulses at predetermined intervals relative to the receipt of a synchronization signal, the duration of said intervals being a function of the number of guideway conductors and the wayside-to-vehicle communication duration, and comparator means for applying a synchronization signal to said timing means when the identification portion of a received wayside-to-vehicle communication matches the identity of the respective vehicle, so that said control pulses coincide with the transmission of subsequent wayside-to-vehicle communications over the same guideway conductor; and
   means for momentarily enabling said sample-and-hold means in time with the development of said control pulses whereby each vehicle is controlled to follow the travel path defined by the guideway conductor with which it is associated.

3. An automated guidance control system comprising:
- a plurality of guideway conductors arranged to define an equal number of partially coincident vehicle travel paths;
- one or more vehicles associated with each of said guideway conductors, each vehicle having a unique vehicle identity code associated therewith;
- wayside control means including means for developing an identity coded control message for each vehicle in sequence and for transmitting the message over the guideway conductor associated with the respective vehicle, and means for regulating the operation of said last mentioned means according to a predetermined time schedule, whereby each guideway conductor is energized in predetermined timed sequence with identity coded control messages for vehicles associated therewith;
- lateral guidance means aboard each vehicle including first means for developing a lateral error signal in response to the detection of an electromagnetic field surrounding an alternating current carrying guideway conductor in the vicinity of the vehicle and second means for controlling the lateral position of the vehicle in response to a lateral error value applied thereto;
- sampling means for applying a lateral error value to said second means, said sampling means being effective when enabled to update said applied value in accordance with the instantaneous value of said lateral error signal;
- control means aboard each vehicle for receiving identity coded control messages from a guideway conductor, said control means including identity recognition means effective to compare the received vehicle identity code with a compatible representation of the identity of its respective vehicle and to detect correspondence therebetween; and
- lateral timing means aboard each vehicle including timer means operated at a frequency corresponding to said predetermined time schedule, means responsive ot said identity recognition means for synchronizing said timer means in accordance with said correspondence, and means for momentarily enabling said sampling means in accordance with the frequency of said timer means so that each vehicle samples its lateral error value whenever its associated guideway conductor is energized, whereby each vehicle is controlled to follow the travel path defined by the conductor with which it is associated.

* * * * *